(12) United States Patent
Oohashi et al.

(10) Patent No.: US 6,977,890 B2
(45) Date of Patent: Dec. 20, 2005

(54) DECISION-MAKING ROUTE CONTROL SYSTEM AND DECISION-MAKING ROUTE CONTROLLING METHOD

(75) Inventors: Yasuharu Oohashi, Tokyo (JP); Seisiro Mitsuya, Tokyo (JP); Mika Emura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 812 days.

(21) Appl. No.: 09/775,822

(22) Filed: Feb. 5, 2001

(65) Prior Publication Data

US 2001/0021173 A1   Sep. 13, 2001

(30) Foreign Application Priority Data

Feb. 9, 2000   (JP) .............................. 2000-031940
Mar. 30, 2000   (JP) .............................. 2000-094516

(51) Int. Cl.[7] ........................ G01R 31/08; G06F 11/00; G08C 15/00; H04J 1/16; H04L 1/00
(52) U.S. Cl. ..................... 370/228; 370/216; 370/241; 370/400; 340/825.01; 714/4
(58) Field of Search .............................. 370/216, 217, 370/218, 219, 220, 221, 228, 242, 244, 245, 370/248, 249, 250, 254, 255, 241, 395.1, 370/397, 399, 400, 469; 709/239, 240, 218, 709/223, 224, 238, 250; 714/2, 4, 43, 47, 714/48, 51, 56, 57; 340/825.01, 825.07, 825.08

(56) References Cited

U.S. PATENT DOCUMENTS

| | | | | |
|---|---|---|---|---|
| 5,710,885 A | * | 1/1998 | Bondi | 709/224 |
| 6,173,312 B1 | * | 1/2001 | Atarashi et al. | 709/203 |
| 6,249,820 B1 | * | 6/2001 | Dobbins et al. | 709/238 |
| 6,286,058 B1 | * | 9/2001 | Hrastar et al. | 710/8 |
| 6,301,223 B1 | * | 10/2001 | Hrastar et al. | 370/227 |

FOREIGN PATENT DOCUMENTS

| | | | |
|---|---|---|---|
| JP | 02-277354 | | 11/1990 |
| JP | HEI 6-164582 | * | 6/1994 |
| JP | 09-186718 | | 7/1997 |
| JP | HEI 10-23060 | * | 1/1998 |
| JP | 11-177573 | | 7/1999 |

OTHER PUBLICATIONS

Instruction Manual of "HIT-3057C Satellite Router with IT-SAT1", Hitachi Information Technology Co., Ltd., 1999 (w/ statement of relevance).
Japanese Office Action dated Jun. 28, 2005.

* cited by examiner

*Primary Examiner*—Wellington Chin
*Assistant Examiner*—Jamal A. Fox
(74) *Attorney, Agent, or Firm*—Buchanan Ingersoll PC

(57) ABSTRACT

In a decision-making route control system, an IP network is constructed by using the routing protocol, and general protocols of SNMP and ICMP. Thus, the route can be switched at the time of route trouble and under particular conditions without arrangement of particular routers by monitoring a state of a network system or a computer previously decided as the monitored object.

9 Claims, 11 Drawing Sheets

DECISION-MAKING ROUTE CONTROL SYSTEM AND DECISION-MAKING ROUTE CONTROLLING METHOD

BACKGROUND OF THE INVENTION

1. Description of the Related Art

The present invention relates to a routing route control system and a routing route controlling method capable of performing the route switching at the time of route trouble and under predetermined decision conditions, by combining the routing protocol with SNMP (Simple Network Management Protocol) and ICMP (Internet Control Message Protocol) as the network management protocol in the route control in the IP (Internet Protocol) network.

2. Description of the Related Art

The route change of the IP network in the prior art is controlled by the routing protocol. In the control executed by the routing protocol, the route can be switched at the time of route trouble by exchanging the information between the routers, nevertheless the route change cannot be performed under particular conditions.

Also, in Patent Application Publication (KOKAI) Hei 10-23060, there is disclosed the network system that can be restored in a short time at the time of trouble by switching the function from the master router to the back-up router when the trouble occurs in the particular router.

FIG. 12 shows the network system set forth in Patent Application Publication (KOKAI) Hei 10-23060. A plurality of terminal devices 49-1 to 49-N are connected via a LAN 55 and also connected the terminal devices 53-1 to 53-M via the master router 41, the back-up router 42, the WAN 54, the master router 50, the back-up router 52, and the LAN 56. When the trouble occurs in the master router 41, the trouble informing portion 43 informs the back-up router 42 of occurring of the trouble, and loads the trouble occurring information into the trouble information table 45 and also copies contents in the routing table 44 into the routing table 47 in the back-up router 42 via the input/output device 48 and the external input/output processing portion 46. Thus, when the information are transmitted to the master router 41, the back-up router 42 can function in place of the master router 41, whereby the restoration and the route switching can be controlled in a short time at the time of trouble in the master router.

In order to switch the route at the time of route trouble, the particular back-up router having the route switching function is needed in the network system in the prior art, and thus the system for satisfying such need must be constructed. Also, there is the problem that the route cannot be switched under the particular conditions other than the trouble.

SUMMARY OF THE INVENTION

The present invention has been made to overcome the above problems, and it is an object of the present invention to control the route switching by constructing the IP network based on the general protocols such as the routing protocol, SNMP, and ICMP without arrangement of the particular back-up router.

Accordingly, in the network including a first route and a second route both are different in line speed, line cost, reliability, traffic, etc., there can be provided the system which is capable of switching the route from the first route as the ordinary route to the second route when the route trouble or the particular condition is caused.

A decision-making route control system according to the present invention comprises a monitoring means for monitoring a state of a network to collect route information and decision elements for decision making; a judging means for judging a route switching based on the route information, the decision elements, and predetermined decision conditions; a decision-making judging computer consisting of a controlling means for outputting a route judged by the judging means as control information; a route generating router for replacing the control information with route switching information to output it; and a route propagating router having a routing table, and executing route propagation to a sender router based on routing information in the routing table and route switching information transferred from the route generating router.

Also, the decision-making judging computer transfers control information generated by a network management protocol to the route generating router based on route information collected by the network management protocol and the decision elements for decision making, and the route generating router, the route propagating router, and the sender router execute route propagation based on a routing protocol.

Also, the route generating router has a loop-back interface or a logical line, replaces a route valid/invalid situation as control information transferred from the controlling means based on a network management protocol with route switching information based on a routing protocol, and then outputs it to the route propagating router.

Also, the monitoring means collects route information of a first route and a second route and decision elements for decision making by monitoring a state of a network.

Also, the judging means has a predetermined threshold value in predetermined decision conditions, and interrupts switching for the first route and set the second route as a information propagation route when a traffic exceeds this threshold value.

A decision-making route control system according to the present invention comprises a monitoring means for monitoring a state of a network to collect route information and decision elements for decision making; a judging means for judging a route switching based on the route information, the decision elements, and predetermined decision conditions; a decision-making judging computer consisting of a controlling means for outputting a route judged by the judging means as control information; a route update logical network connecting router for switching a route from a first route side to a second route side in updating the route; and a logical network connecting router having route information and a routing table, and executing route propagation to a sender router by reflecting route information on the routing table based on control information transferred from the controlling means, and having a relaying function for relaying information to a first route or a second route in compliance with a route valid/invalid situation transferred from the controlling means based on a network management protocol.

Also, the decision-making judging computer transfers control information generated by the network management protocol to the logical network connecting router in compliance with route information collected by the network management protocol and decision elements for decision making, and the logical network connecting router, the route update logical network connecting router, and the sender router execute route propagation based on a routing protocol.

Also, the logical network connecting router has a logical line to propagate a route to the sender router, and has a relaying function to the first route or the second route.

Also, the monitoring means grasps a situation of a non-neighboring router by monitoring a route update side router, and collects route information of the first route and the second route and decision elements for decision making.

A decision-making route control system according to the present invention comprises a monitoring means for monitoring a state of a network to collect route information and decision elements for decision making; a judging means for judging a route switching based on the route information, the decision elements, and predetermined decision conditions; a decision-making judging computer consisting of a controlling means for outputting a route judged by the judging means as control information; a control information converting router for replacing the control information transferred from the controlling means to output it; and a route propagating router having a routing table, and executing route propagation to a sender router based on the control information transferred from the control information converting router and routing information in the routing table.

Also, the control information converting router has an address translation table, and address-translates route switching information transferred from the controlling means to the route propagating router to relay it to the route propagating router.

A decision-making route controlling method according to the present invention comprises the steps of monitoring a state of a network to collect route information and decision elements for decision making; judging a route switching based on collected information and predetermined decision conditions; outputting a route valid/invalid situation of a judged route to a route generating router based on a network management protocol; replacing the route valid/invalid situation transferred based on the network management protocol with route switching information based on a routing protocol; outputting replaced route switching information to a route propagating router; and executing route propagation to a sender router based on the route switching information and routing information in a routing table.

A decision-making route controlling method according to the present invention comprises the steps of monitoring a state of a network to collect route information and decision elements for decision making; judging a route switching based on collected information and predetermined decision conditions; outputting a route valid/invalid situation of a judged route to a logical network connecting router based on a network management protocol; replacing the route valid/invalid situation transferred by the network management protocol with route switching information based on a routing protocol; executing route propagation to a sender router based on replaced route switching information and routing information in a routing table; and selecting a relay to a first route or a second route according to the route valid/invalid situation.

A decision-making route controlling method according to the present invention comprises the steps of monitoring a state of a network to collect route information and decision elements for decision making; judging a route switching based on collected information and predetermined decision conditions; outputting a route valid/invalid situation of a judged route to a route propagating router based on a routing protocol; replacing a sender address of control information transferred by the routing protocol and relaying it to the route propagating router; and executing route propagation to a sender router based on control information and routing information in a routing table.

DETAILED DESCRIPTION OF THE PREFERRED EMBODIMENTS

Now, a description will be given in more detail of preferred embodiments of the invention with reference to the accompanying drawings.

Embodiment 1

An embodiment 1 of the present invention will be explained with reference to FIG. 1 to FIG. 5 hereunder.

Figure 1:
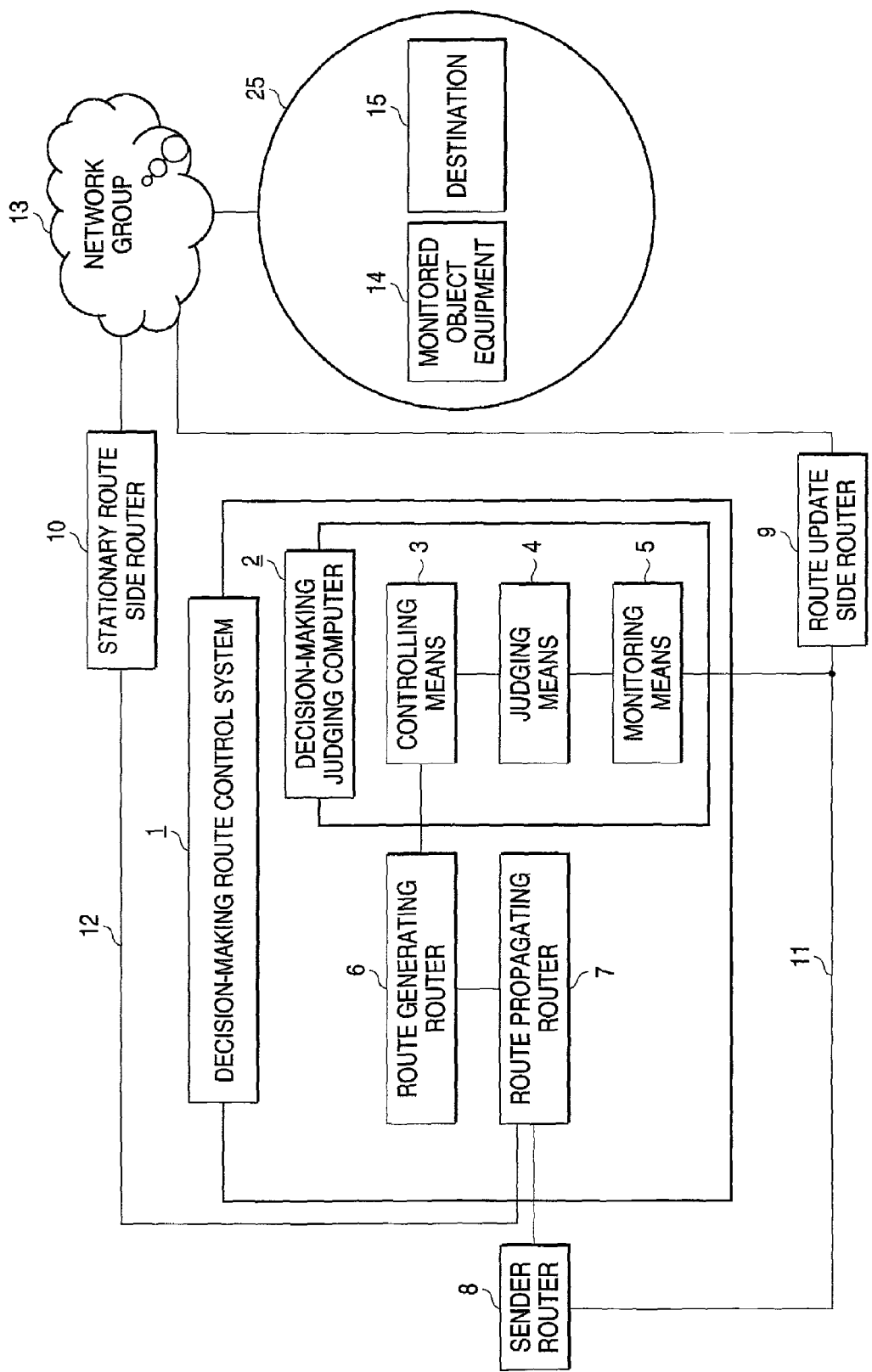
FIG. 1 is a block diagram showing an overall configuration of an embodiment 1 of the present invention.

FIG. 1 is a block diagram showing an embodiment 1 of the present invention. As shown in FIG. 1, in a decision-making route control system according to the embodiment 1, a decision-making route control system 1 including a decision-making judging computer 2, a route generating router 6, and a route propagating router 7. According to the state of a network system or a monitored object equipment 14 consisting of a computer previously decided to monitor the state of the network, the packet that is a package of information transmitted from a sender router 8 can be switched to either a stationary route side router 10 as a first route 12 or a route update side router 9 as a second route 11 and then transmitted to a destination network 25 via a network group 13 which the packet can reach logically without the neighboring relationship. Also, assume that the monitored object equipment 14 and a destination 15 belong to a destination network 25.

The decision-making judging computer 2 is such a computer that has functions of SNMP (Simple Network Management Protocol) manager and ICMP (Internet Control Message Protocol) and make the decision to switch the route, and consists of a monitoring means 5 for collecting decision materials for the decision making, a judging means 4 for judging the route switching, and a controlling means 3 for controlling the route generating router 6. Control procedures in the decision-making judging computer 2 will be explained later with reference to FIG. 3.

In FIG. 1, flow of the packet transmitted from the sender router 8 and the routing protocol will be explained hereunder.

Normally, since the packet transmitted from the sender router 8 is propagated from the route propagating router 7 over the stationary route, it can come up to the destination network 25 via the route propagating router 7, the first route 12, the stationary route side router 10, and the network group 13. Also, when the packet transmitted from the sender router 8 is not propagated from the route propagating router 7 over the stationary route based on the decision making, it reaches the destination network 25 via the second route 11, the route update side router 9, and the network group 13.

The sender router 8 is connected to two routers of the route propagating router 7 and the route update side router 9, and exchanges the route information collected by each router based on the routing protocol. Assume that the protocol provided between the sender router 8 and the route propagating router 7 is RP1 and the protocol provided between the sender router 8 and the route update side router 9 is RP4, and it is previously learned internally that the protocol RP1 has preference to the protocol RP4. As the learning method, there are the method in which priorities are explicitly set higher in the router in the order of the protocol RP1 and the protocol RP4 and the method which learns the low priority resultantly by propagating the low priority of the protocol RP4 by using the dynamic routing protocol.

Also, the route propagating router 7 is connected to three routers of the route generating router 6, the sender router 8, and the stationary route side router 10, and exchanges the route information in the same way. Assume that the protocol provided between the route propagating router 7 and the sender router 8 is RP1, the protocol provided between the route propagating router 7 and the route generating router 6 is RP2, and the protocol provided between the route propagating router 7 and the stationary route side router 10 is RP3. It is learned previously that priorities of the protocols in the route propagating router 7 are set higher in the order of the protocol RP2, the protocol RP3, and the protocol RP1. The learning method is mentioned above. Also, it is set previously in the route propagating router 7 that the route information received by the protocol RP1 and the protocol RP2 are not transmitted to other routers.

Figure 2:
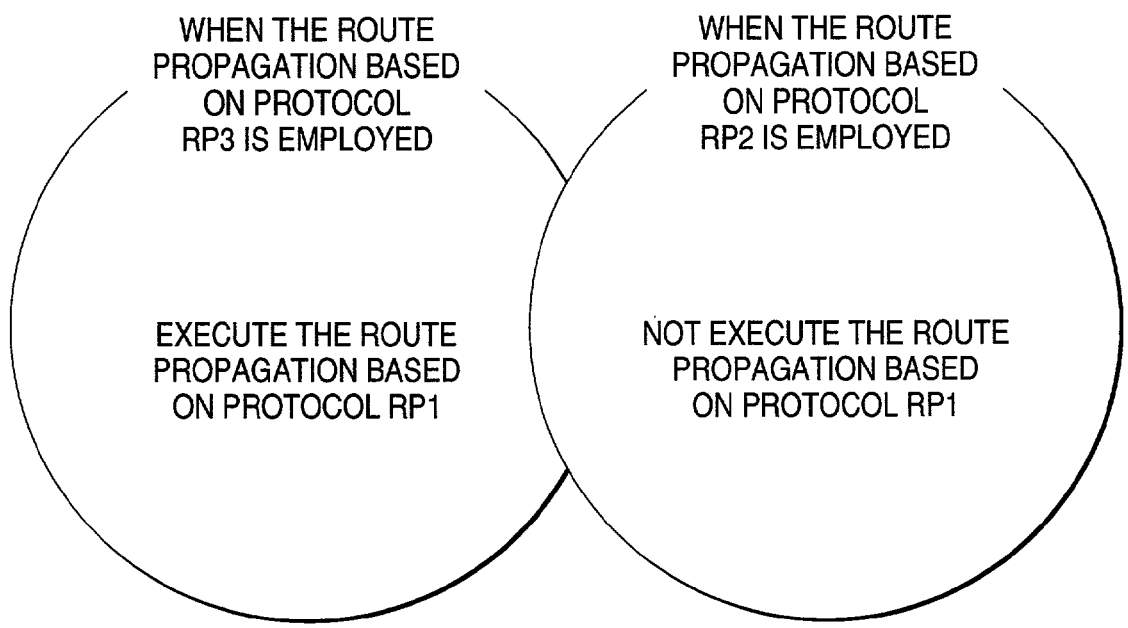
FIG. 2 is a block diagram showing the arranged state in which route control is performed by setting priorities of protocols and route propagation in a route propagating router 7 in the embodiment 1 of the present invention.

FIG. 2 is a schematic block diagram showing the arranged state in which the route control is carried out by setting priorities of above protocols and the route propagation in the route propagating router 7. As shown in FIG. 2, when the packet is propagated via the route from the protocol RP2, it is not propagated over the route to the sender router 8 based on the protocol RP1. Also, when the packet is propagated via the route from not the protocol RP2 but the protocol RP3, it is propagated over the stationary route to the sender router 8 based on protocol RP1.

Then, control procedures in the decision-making judging computer 2 will be explained with reference to FIG. 3 hereunder. In step S1, the monitoring means 5 transmits a SNMP GET request or an ICMP Echo (ping) to the monitored object equipment 14 to monitor the state of the monitored object equipment 14 and collect decision materials. In step S2, the decision materials received from the monitored object equipment 14 by a SNMP GET response or an ICMP Echo reply is transferred to the judging means 4. Also, when a Trap transmission based on the transmission requirements previously set by a Trap transmitting function of the monitored object equipment 14 is generated, the decision materials are collected in step S3. The Trap transmitting function of the monitored object equipment 14 will be explained later with reference to FIG. 5.

In step S4, the judging means 4 decides from the decision materials transferred from the monitoring means 5 whether or not the route should be changed based on information of the decision interval and the decision threshold value in the decision making defined previously by the user. Then, if the route should be switched, the decision result is transferred to the controlling means 3. It is decided that the route should not be switched, the process returns to step S1. As an example of the decision, in the case that the router that always receives the packet is set as the monitored object equipment 14, it is decided that the route is not available and the route should be switched when an amount of received packet per unit time is measured and then the amount is less than a constant value.

In step S5, based on the decision of the judging means 4, the controlling means 3 controls the route generating router 6 to decide whether the stationary route is set to either a valid state or an invalid state by the SNMP SET command.

The control in the route generating router 6 to decide whether the stationary route is set to the valid state or the invalid state by the SNMP SET command employs not the particular extended MIB (Management Information Base) but the standard MIB (RFC1213). Therefore, the route generating router 6 does not need the particular MIB about the routing table, and thus it can be implemented by the router into which the standard MIB is installed.

Figure 3:
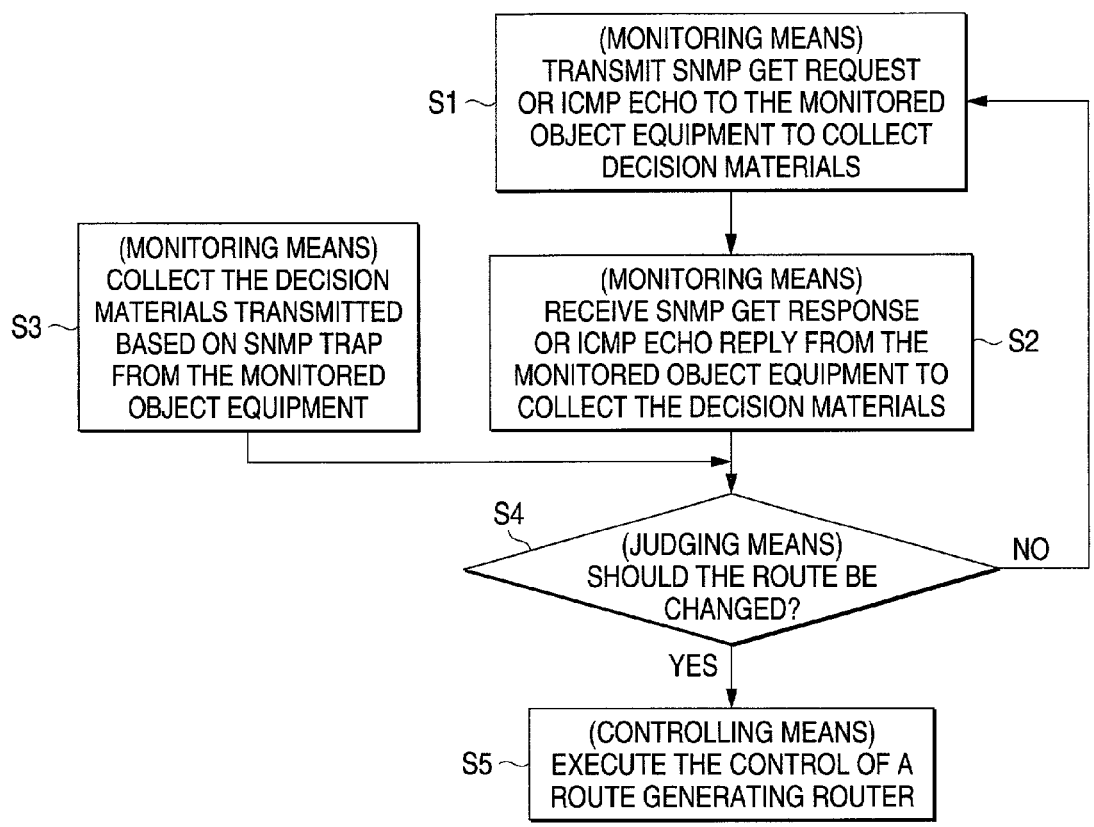
FIG. 3 is a flowchart showing flow of process in a decision-making judging computer 2 in the embodiment 1 of the present invention.

In FIG. 3, the route control according to the monitoring by using a combination of SNMP and ICMP is shown. However, if the decision materials of the monitored object equipment 14, the protocols to which the monitored object equipment 14 corresponds, and the optimum collecting method are selected, the route control according to the monitoring by using only SNMP or only ICMP may be executed.

Then, the route generating router 6 controlled by the controlling means 3 will be explained hereunder. The route generating router 6 contains internally a route definition 61 in which a loop-back interface or a logic circuit is uniquely correlated with a physical network. The valid/ invalid state of the stationary route transferred from the controlling means 3 is converted into ON/OFF information of the loop-back interface or the logic circuit contained in the route generating router 6 by the SNMP SET command and then informed. At this time, the OFF state of the loop-back interface or the logic circuit is informed when the stationary route is valid, and the ON state of the loop-back interface or the logic circuit is informed when the stationary route is invalid.

A flow of the process will be explained with reference to FIG. 4. The route generating router 6 contains internally the route definition 61 in which the loop-back interface or the logic circuit is uniquely correlated with the physical network, and controls the route switching by reflecting the definition contents on a routing table 62. In FIGS. 4a and 4b, the loop-back interface is shown in as an example. Also, one destination network 25 is shown and described as N1. In addition, the loop-back interface corresponding to N1 is described as a loop-back interface 1.

Figure 4:
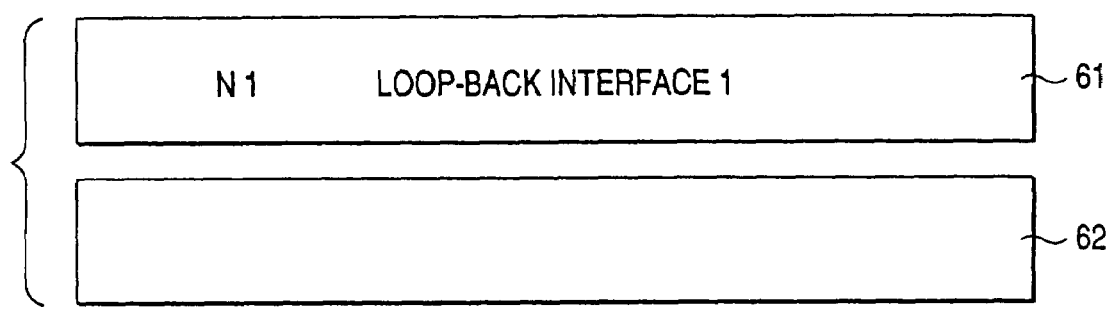
FIGS. 4a and 4b are block diagrams showing changed contents in a route definition 61 and a routing table 62 contained in a route generating router 6 when the control is applied from a controlling means 3 in the embodiment 1 of the present invention.
Figure 4:
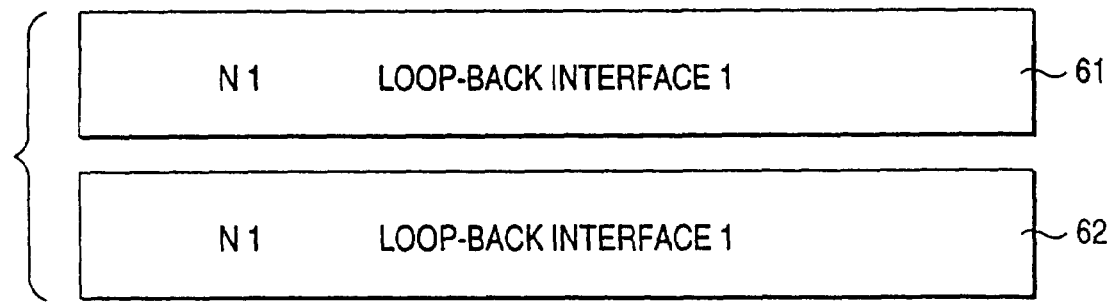

If the stationary route is valid in (a) of FIG. 4, the loop-back interface is brought into the OFF state by the SNMP SET command. Accordingly, when the loop-back interface is entered into the routing table 62, the entered content is erased. As a result, the protocol RP2 does not propagate the route to the route propagating router 7.

If the stationary route is invalid in (b) of FIG. 4, the loop-back interface is brought into the ON state by the SNMP SET command. Accordingly, the content of the route definition 61 is entered into the routing table 62. As a result, the protocol RP2 propagates the route for the route generating router 6 to the route propagating router 7. In other words, the content in the routing table 62 is erased when the loop-back interface is set to the OFF state, and the content in the route definition 61 is reflected on the routing table 62 when the loop-back interface is set to the ON state.

Then, an operation of the route propagating router 7 will be explained hereunder. The route propagating router 7 has a plurality of routing protocols, and has a function for propagating the route to the sender router 8 based on the route propagation contents transmitted from the route generating router 6 and the stationary route side router 10 and the route information in the routing table contained in the inside. The route propagating router 7 contains a function for propagating the stationary route to the sender router 8 and a function for relaying the packet from the sender router 8 independently.

The stationary route propagating function of the route propagating router 7 will be explained hereunder. The route propagating router 7 receives the route information from the stationary route side router 10 based on the protocol RP3 and the route generating router 6 based on the protocol RP2. In this case, as described above, it is set that the route information received based on the protocol RP2 are not propagated to other routers.

When the stationary route is valid, the route is not propagated based on the protocol RP2, and thus the route information propagated from the stationary route side router 10 based on the protocol RP3 are propagated to the sender router 8. Also, when the stationary route is invalid, the route propagation is carried out by the protocol RP2 and the protocol RP3. In this case, like the above explanation by using FIG. 2, since it is defined that the route information from all protocols are not propagated when the route propagation is carried out by the protocol RP2, the route propagation for the sender router 8 is not carried out.

Also, the packet relaying function of the route propagating router 7 transmits the packet transmitted from the sender router 8 to the stationary route side router 10. This is because, as described above, the route is not propagated based on the protocol RP2 when the stationary route is valid, and thus the selectable route is merely the stationary route side router 10 propagated based on the protocol RP3.

Then, an operation of the sender router 8 will be explained hereunder. As described above, when the packet is propagated from the route propagating router 7 via the stationary route, the sender router 8 learns preferentially the protocol RP1 rather than the protocol RP4. Therefore, the sender router 8 transmits the packet via the first route 12. Since the selectable route is merely the second route 11 propagated based on the protocol RP4 when the packet is not propagated via the stationary route, the packet is transmitted via the second route 11.

Finally, an operation of the monitored object equipment 14 will be explained hereunder. The monitored object equipment 14 serves as the network management client of the decision-making judging computer 2. That is, the monitored object equipment 14 as the network management client sends back the SNMP GET response in answer to the SNMP GET request issued from the decision-making judging computer 2 acting as the server and sends back the ICMP Echo reply in answer to ICMP Echo. Also, if the SNMP Trap transmitting function is set previously in the monitored object equipment 14, the decision-making judging computer 2 can collect the decision materials by the Trap when the transmitting condition occurs on the network management client side.

Figure 5:
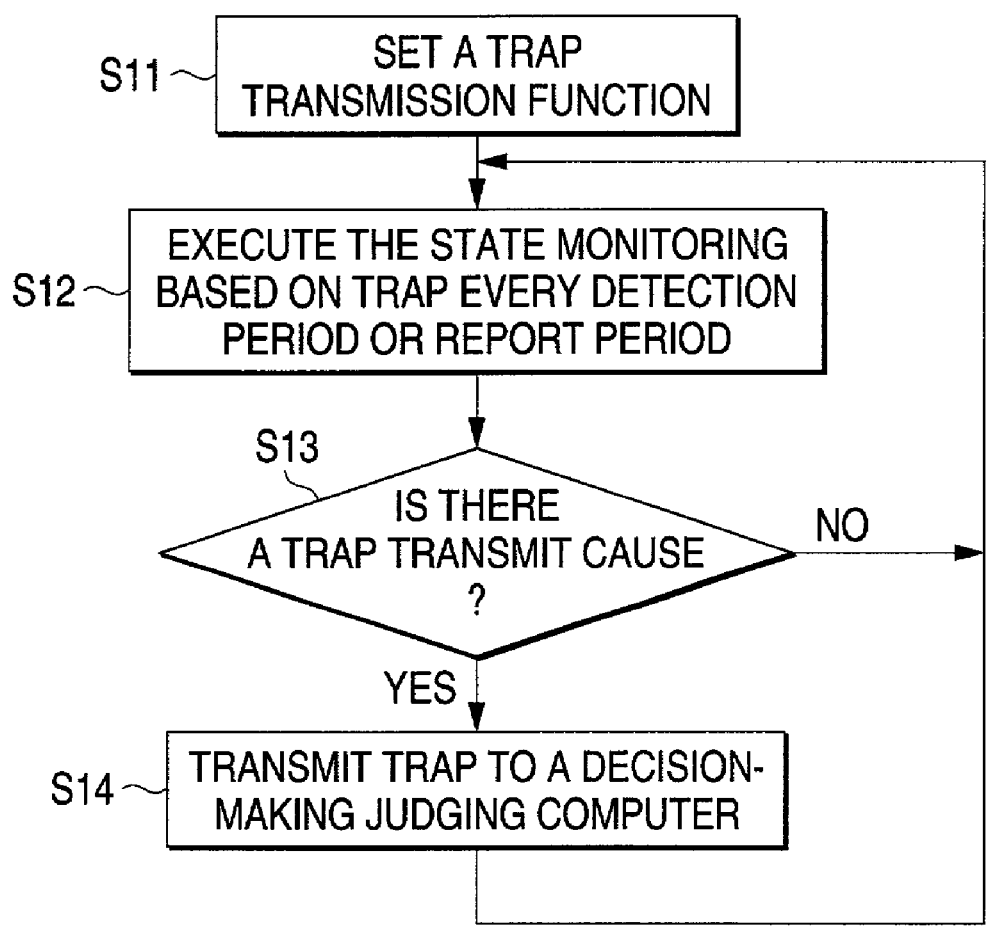
FIG. 5 is a flowchart showing flow of process in a monitored object equipment 14 in the embodiment 1 of the present invention.

Process procedures of the Trap transmitting function in the monitored object equipment 14 will be explained with reference to FIG. 5 hereunder.

In step S11, the Trap transmitting function is initialized. Set contents are monitored items, threshold values, detection periods, and Trap destinations. At this time, the Trap destination is defined as the decision-making judging computer 2. As an example of monitored items, there are the traffic of the route to which the monitored object equipment 14 is connected, the physical state, and the number of times of route error detection. In step S12, the monitored object equipment 14 monitors the route, which is connected to the monitored object equipment 14 per se, at the set detection period or report period. In step S13, when it is judged as the result of monitoring that the Trap transmitting condition occurs, the process goes to step S14 wherein the cause is described in the Trap and then the Trap is transmitted to the decision-making judging computer 2. In contrast, in step S13, if no Trap transmitting cause is present, the process returns to step S12 wherein the monitoring based on the detection period is executed.

In the present embodiment, the sender router 8 corresponds to the destination network 25, to which the monitored object equipment 14 and the destination 15 belong, on a one-by-one basis. But, in the present system, the monitored object equipment 14 can be decided every destination 15 in a plurality of networks. At that time, since respective monitored object equipments 14 serve as the network management clients for the decision-making route control system 2, the route control can be executed every destination network 25 to which the destination 15 belong.

There are two following functions as additional functions.

A breaking function is such a function that can interrupt the switching to the first route when the traffic exceeds a predetermined threshold value that is provided to the judging means 4. Thus, if the valid/invalid state of the route is transmitted from the controlling means 3 to the route generating router 6 by the SNMP SET command, the second route can be set as the route for transmitting the information to all destination networks 25. Also, this breaking function has threshold values in blocks of several networks, and the switching can be interrupted in unit of block when the traffic exceeds the thresholds.

In the event that the route for the network group 13 is one-way communication system which is represented by the satellite communication or the communication system which is represented by the public network and in which the routing protocol is not used in the middle of the route, if the protocol RP3 is registered as the static routing protocol as the function to which the decision-making route control system corresponds, the decision-making route control system 1 can operate not to take account of the route state of the network group 13 to which the packet can reach logically without the neighboring relationship from the sender router to the destination network 25 to which the destination 15 belongs.

Embodiment 2

An embodiment 2 of the present invention will be explained with reference to FIG. 6 and FIG. 7 hereunder.

Figure 6:
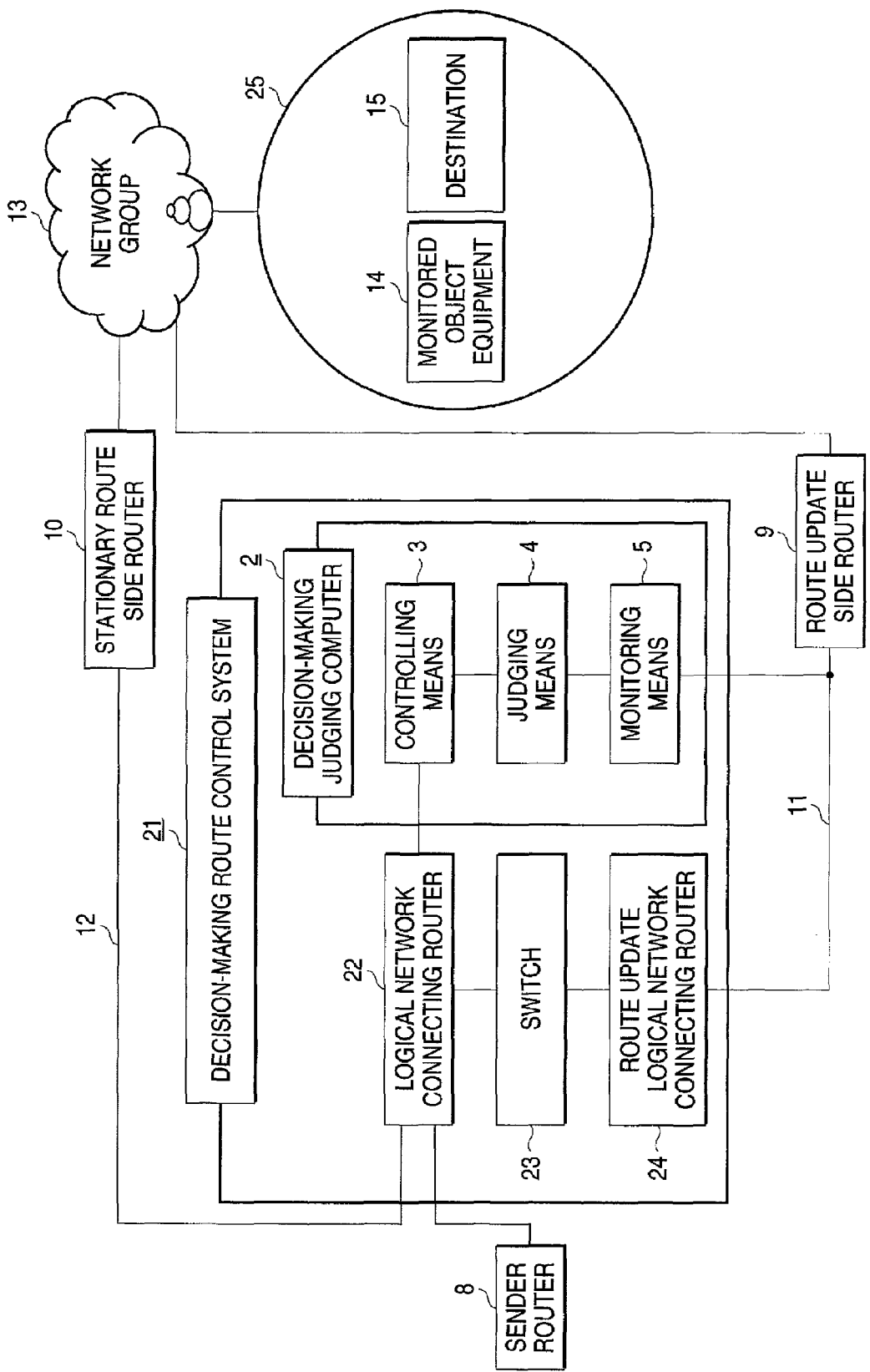
FIG. 6 is a block diagram showing an overall configuration of an embodiment 2 of the present invention.

FIG. 6 is a block diagram showing an embodiment 2 of the present invention. As shown in FIG. 6, in a decision-making route control system of the present embodiment, a decision-making route control system 21 includes the decision-making judging computer 2, a logical network connecting router 22, a switch 23, and a route update logical network connecting router 24. Thus, if the packet transmitted from the sender router 8 is switched to either the stationary route side router 10 as the first route 12 or the route update side router 9 as the second route 11 according to the state of the predetermined network system or the monitored object equipment 14 as the computer, the packet can come up to the destination network 25 via the network group 13, which the packet can reach logically without the neighboring relationship. Also, assume that the monitored object equipment 14 and the monitoring means 5 belong to the destination network 25.

The decision-making judging computer 2 is a computer that has functions of SNMP Manager and ICMP and executes the decision making of the route switching, and consists of the monitoring means 5 for collecting the decision materials in the decision making, the judging means 4 for executing the judgment of the route switching, and the controlling means 3 for controlling the logical network connecting router 22. The monitoring means 5 collects the SNMP GET response and the Trap generated from the SNMP agent by monitoring the state of the monitored object equipment 14, and also monitors the network group 13 from the sender router 8 to the destination network 25 by checking the transmittal by ICMP. The decision materials collected by the monitoring means 5 and received are transferred to the judging means 4. According to the information of decision intervals and decision threshold values in the decision making defined previously by the user, the judging means 4 judges whether or not the route should be switched based on the decision materials transferred from the monitoring means 5. If the route must be switched, the decision result is transferred to the controlling means 3. If it is decided that there is no necessity to switch the route, the process returns to the monitoring means 5. Based on the decision of the judging means 4, the controlling means 3 applies the control that the route for the logical network connecting router 22 should be set to either the valid state or the invalid state by the SNMP SET command. The details are similar to the process in FIG. 3 shown in the embodiment 1.

The control made by the SNMP SET command to decide that the route for the logical network connecting router 22 should be valid or invalid is performed by using not the particular extended MIB but the standard MIB (RFC1213). Therefore, the logical network connecting router 22 can be accomplished by a router into which the standard MIB is installed, without use of the particular MIB about the routing table.

The logical network connecting router 22 and a route update logical network connecting router 24 will be explained hereunder The logical network connecting router 22 and the route update logical network connecting router 24 are routers that are connected mutually by a switch 23 and a logical interface, and have logical interfaces in the same number as the networks as the switching objects.

The logical network connecting router 22 contains internally a route preferential definition 31 in which the logical interface and the physical network are correlated uniquely with each other, and controls the route switching by reflecting the definition contents on the routing table 32. Flow of the detailed process will be explained with reference to FIG. 7. The logical network connecting router 22 contains the route preferential definition 31 and the routing table 32, and definitions of the destinations and the priorities every destination network 25 are described respectively. In FIG. 7, one destination network 25 is shown as an example and described as N1. Also, the logical interface corresponding to N1 described as the logical interface 1.

Figure 7:
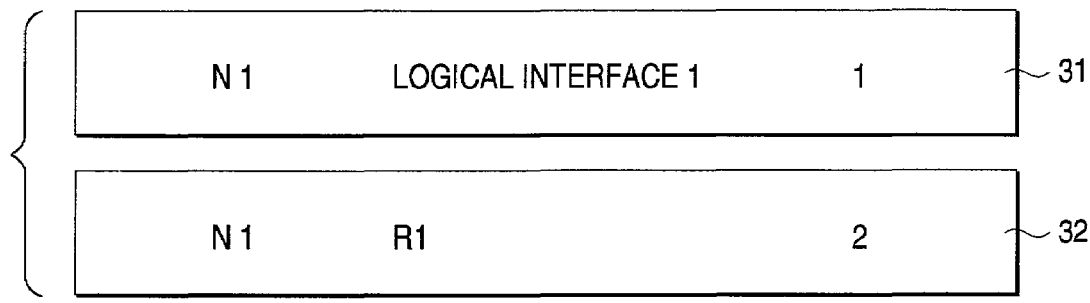
FIG. 7 is a block diagram showing changed contents in a route preferential definition 31 and a routing table 32 contained in a logical network connecting router 22 when the control is applied from the controlling means 3 in the embodiment 2 of the present invention.
Figure 7:
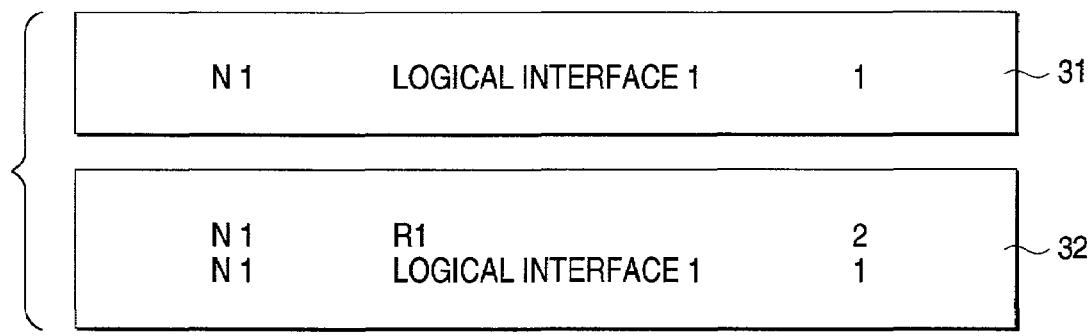
Figure 7:
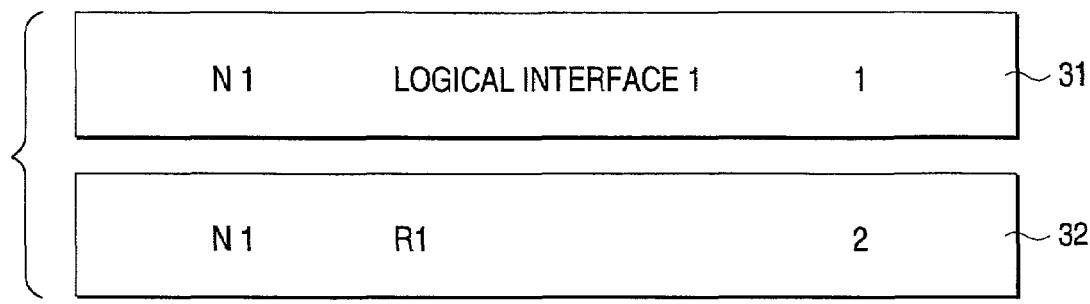

In the initial state in (a) of FIG. 7, the logical interface 1 in N1 in the route preferential definition 31 is defined as the priority 1, and the first route 12 in the routing table 32 is set as R1 and the priority is defined lower than that of the logical interface. In FIG. 7, the priority 2 is set as an example.

Then, in (b) of FIG. 7, when the control indicating that the second route 11 is valid is received from the controlling means 3, the contents of the route preferential definition 31 in (a) of FIG. 7 is entered into the routing table 32. Accordingly, since the route of the logical interface is employed as the result of comparison between the priorities in the routing table 32, the packet transmitted from the sender router 8 is transmitted from the logical network connecting router 22 to the route update side router 9 as the second route 11 via the switch 23 and the route update logical network connecting router 24.

Also, in (c) of FIG. 7, when the control indicating that the second route 11 is invalid is received from the controlling means 3, the entry content is erased if the entry of the logical interface into the routing table 32 is performed. Accordingly, since the route that is looked up in the routing table 32 is merely R1 whose priority is defined as 2, the packet is transmitted to the first route 12.

In the present embodiment, since normally the control from the controlling means 3 indicates that the second route 11 is invalid, the packet is transmitted to the stationary route side router 10 side as the first route 12. Also, when the controlling means 3 receives the control indicating that the second route 11 is valid according to the state of the route update side router 9 as the second route 11, it switches the route to the second route 11.

Then, the switch 23 will be explained hereunder. The logical network connecting router 22 and the route update logical network connecting router 24 are brought logically into their non-connected state to the switch 23, and are connected to the switch 23 in unit of network as the switched object when the route is switched. The switch 23 is the switching system for switching a plurality of logic lines. At this time, the logical interfaces are constructed by X.25, frame relays, ATM (Asynchronous Transfer Mode), IEEE802.1Q, etc.

In the event that the route for the network group 13 is one-way communication system which is represented by the satellite communication or the communication system which is represented by the public network and in which the routing protocol is not used in the middle of the route, the decision-making route control system 21 can operate not to take account of the route state of the network group 13 since the route propagation from the stationary route side router 10 to the logical network connecting router 22 or the route propagation from the route update side router 9 to the route update logical network connecting router 24 is not executed by registering the protocol RP11 between the logical network connecting router 22 and the stationary route side router 10 and the protocol RP14 between the route update logical network connecting router 24 and the route update side router 9 as the static routing protocols in the method for correlating the decision-making route control system.

Embodiment 3

An embodiment 3 of the present invention will be explained with reference to FIG. 8 hereunder.

Figure 8:
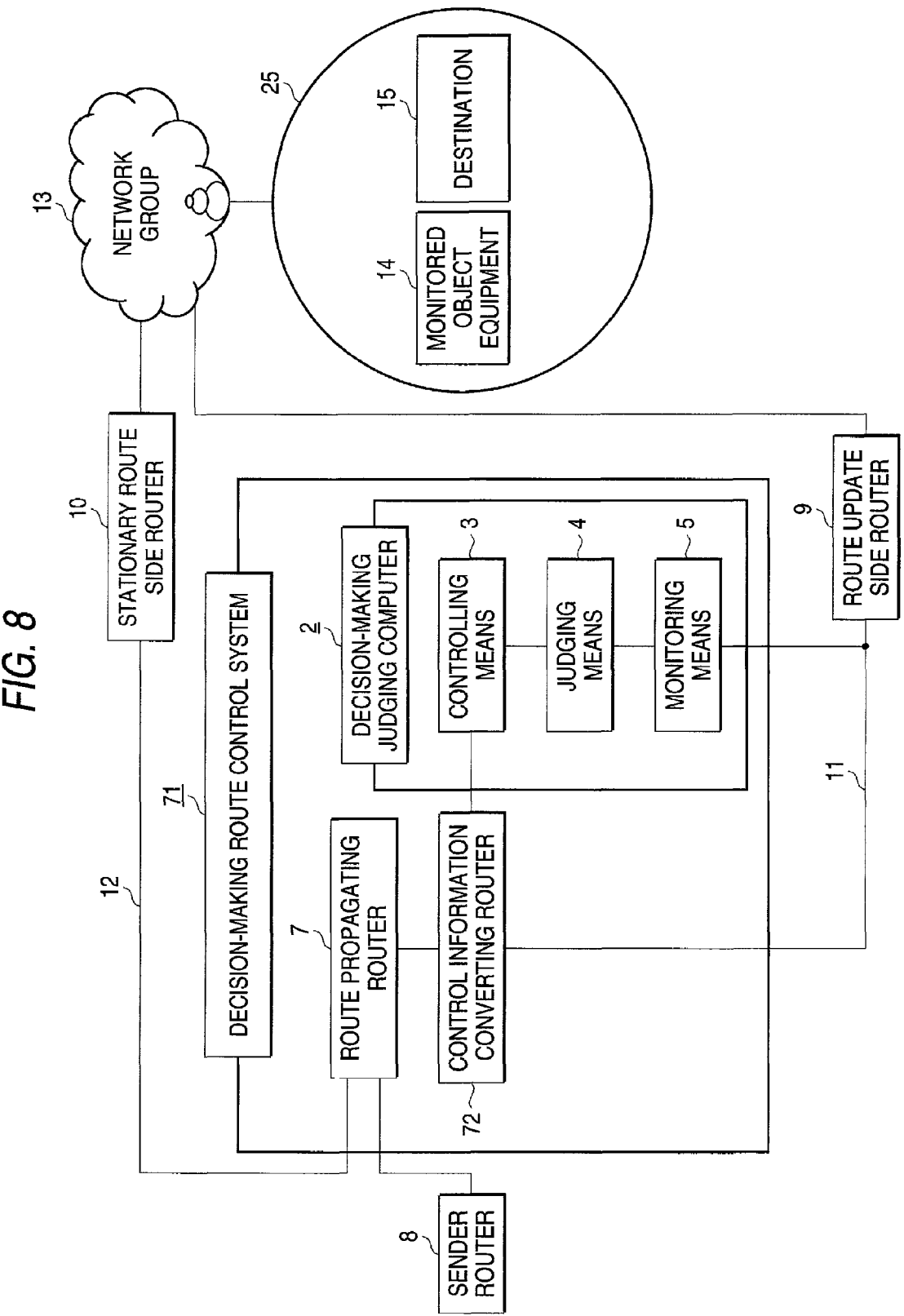
FIG. 8 is a block diagram showing an overall configuration of an embodiment 3 of the present invention.

FIG. 8 is a block diagram showing an embodiment 3 of the present invention. As shown in FIG. 8, in a decision-making route control system according to the present embodiment, a decision-making route control system 71 includes the decision-making judging computer 2, the route propagating router 7, and a control information converting router 72. Thus, if the packet transmitted from the sender router 8 is switched to either the stationary route side router 10 as the first route 12 or the route update side router 9 as the second route 11 according to the state of the predetermined network system to monitor the state of the network or the monitored object equipment 14 as the computer, the packet can come up to the destination network 25 via the network group 13, which the packet can reach logically without the neighboring relationship. Also, it is assumed that the monitored object equipment 14 and the destination 15 belong to the destination network 25.

In FIG. 8, flow of the packet transmitted from the sender router 8 and the routing protocol will be explained hereunder.

Normally, the packet transmitted from the sender router 8 reaches the destination network 25 via the route propagating router 7, the first route 12, the stationary route side router 10 and the network group 13. Also, when the route is changed to the second router 11 based on the decision making, the packet transmitted from the sender router 8 comes up to the destination network 25 via the route propagating router 7, the control information converting router 72, the second route 11, the route update side router 9, and the network group 13.

The control information converting router 72 is connected to two routers of the route propagating router 7 and the route update side router 9, then converts the information of RIP (Routing Information Protocol) RP13 transmitted from the decision-making judging computer 2 by a control information converting function described later to the RIP RP14, and then transmits it to the route propagating router 7. At that time, the control information converting router 72 itself is defined not to receive the route information from the RIP RP13 and the RIP RP14. Also, the control information converting router 72 receives the route information from the route update side router 9 based on the protocol RP15.

Also, the route propagating router 7 is connected to three routers of the sender router 8, the control information converting router 72, and the stationary route side router 10. Assume that a protocol between the route propagating router 7 and the sender router 8 is the protocol RP11 and a protocol between the route propagating router 7 and the stationary route side router 10 is the protocol RP12, and the route propagating router 7 receives the RIP RP14 converted from the RIP RP13 from the control information converting router 72. Also, when the route information are reflected on the routing table, the route propagating router 7 learns that the learning priority is set higher in the order of RP14, RP12, and RP11.

In the present embodiment, RP13 and RP14 is assumed as RIP as one of the routing protocols. In this case, other routing protocols can be implemented even if they are the routing protocol employing the broadcast.

Then, the decision-making judging computer 2 will be explained hereunder. The decision-making judging computer 2 is a computer that has functions of SNMP manager and ICMP and RIP, and performs the decision making of the route switching, and consists of the monitoring means 5 for collecting the decision materials in the decision making, the judging means 4 for judging the route switching, and the controlling means 3 for switching the route.

Control procedures in the decision-making judging computer 2 will be explained with reference to FIG. 9 hereunder. The processes in step S21 to step S24 are similar to those in step S1 to step S4 in FIG. 3 in the embodiment 1. Also, the Trap transmitting function of the monitored object equipment 14 is similar to the process in FIG. 5 shown in the embodiment 1.

In step S25, based on the judgment of the judging means 4, the controlling means 3 executes the control that the stationary route is valid or invalid, by propagating or not propagating the RIP RP13 as the control information to the route propagating router 7 via the control information converting router 72. The details will be explained later with reference to FIG. 10.

Figure 9:
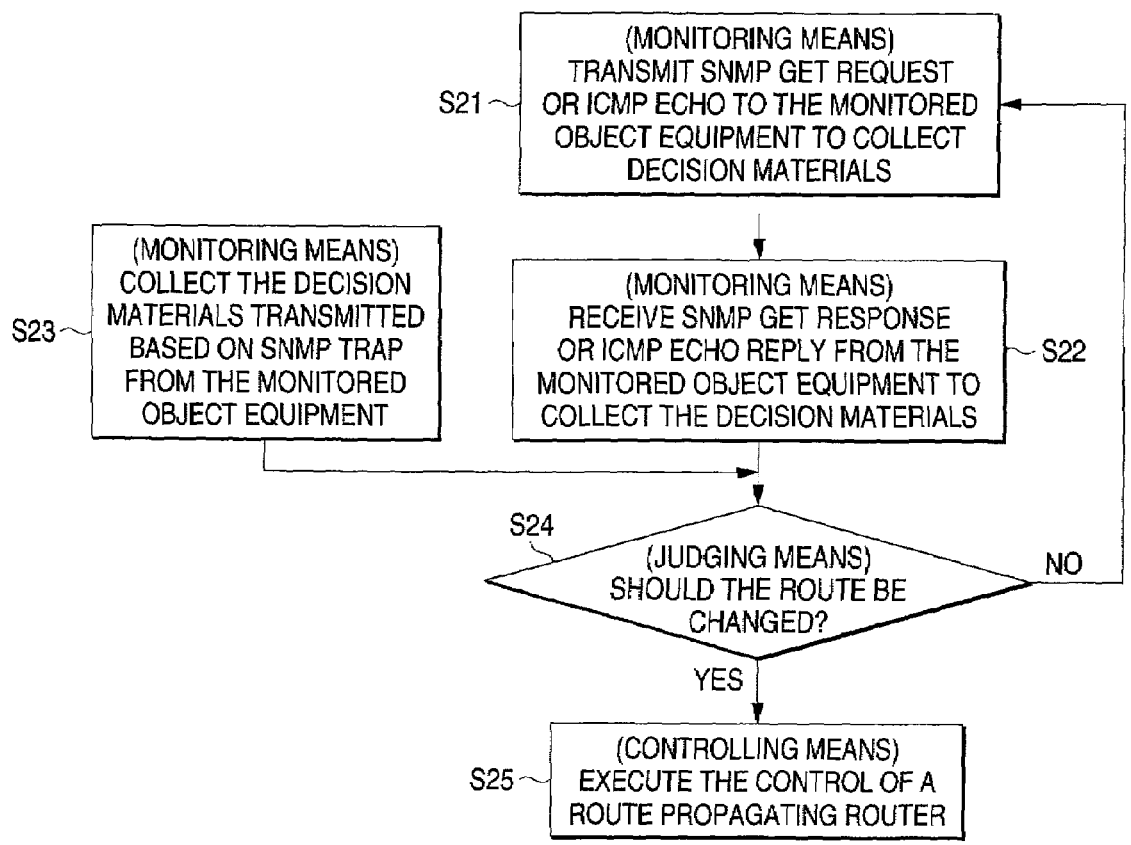
FIG. 9 is a flowchart showing flow of process in the decision-making judging computer 2 in the embodiment 3 of the present invention.

In FIG. 9, the route control by monitoring the combination of SNMP and ICMP is shown. Like the embodiment 1, the route control can be carried out by monitoring only SNMP or only ICMP according to the decision materials of the monitored object equipment 14, the protocols to which the monitored object equipment 14 corresponds, and the selection of the optimum collecting method.

Figure 10:
FIG. 10 is a block diagram showing changed contents in a route information table 91 contained in the controlling means 3 in the embodiment 3 of the present invention.
Figure 10:

A method of propagating the RIP RP13 as the control information to the route propagating router 7 by the controlling means 3 will be explained with reference to FIG. 10 hereunder. The controlling means 3 contains a route information table 91, and also updates the contents of the route information table 91 based on the decision result made by the judging means 4. The RIP RP13 is propagated by entering the destination network in this table. In FIG. 10, one destination network 25 is shown as an example and described as N11.

In (f) of FIG. 10, if the stationary route is valid, no entry of N11 is contained in the route information table 91 and thus the RIP RP13 is not propagated.

In (g) of FIG. 10, if the stationary route is invalid, the entry of N11 is input into the route information table 91 and thus the RIP RP13 is propagated.

The RIP RP13 as the control information has the sender address of the RIP RP13 as the address of the decision-making judging computer 2, and can propagate the packet to the route propagating router 7 via the control information converting router 72 by replacing the destination of the RIP RP13 from the broadcast address for all neighboring routers to the address of the route propagating router 7. According to this function, the packet can be transmitted to the route propagating router 7 having no neighboring relationship not to affect the route information of the control information converting router 72 having the neighboring relationship, while employing RIP having the neighboring routers as the transmit object. Also, in order to receive the control information, the route propagating router 7 is not required to install the particular protocol, and thus the route propagating router 7 can be implemented by the routers into which the RIP is installed.

The control information converting router 72 will be explained hereunder. The control information converting router 72 has independently a control information converting function for converting the information of the RIP RP13 transmitted by the decision-making judging computer 2 into the RIP RP14 and then transmitting it to the route propagating router 7, a routing table generating function for learning the route information from the protocol RP 15 from the route update side router 9, and a packet relaying function from the route propagating router 7.

Figure 11:
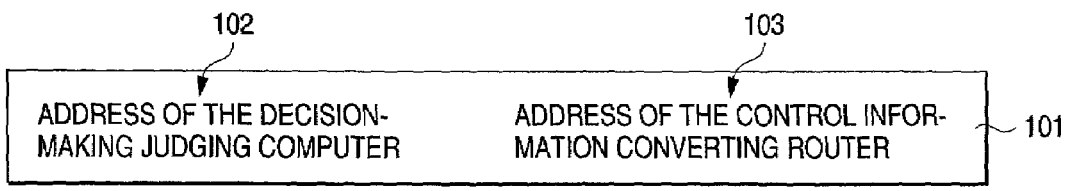
FIG. 11 is a view showing an address translation table 101 which is referred to by an address translating function of a control information converting router 72 in the embodiment 3 of the present invention.
Figure 12:
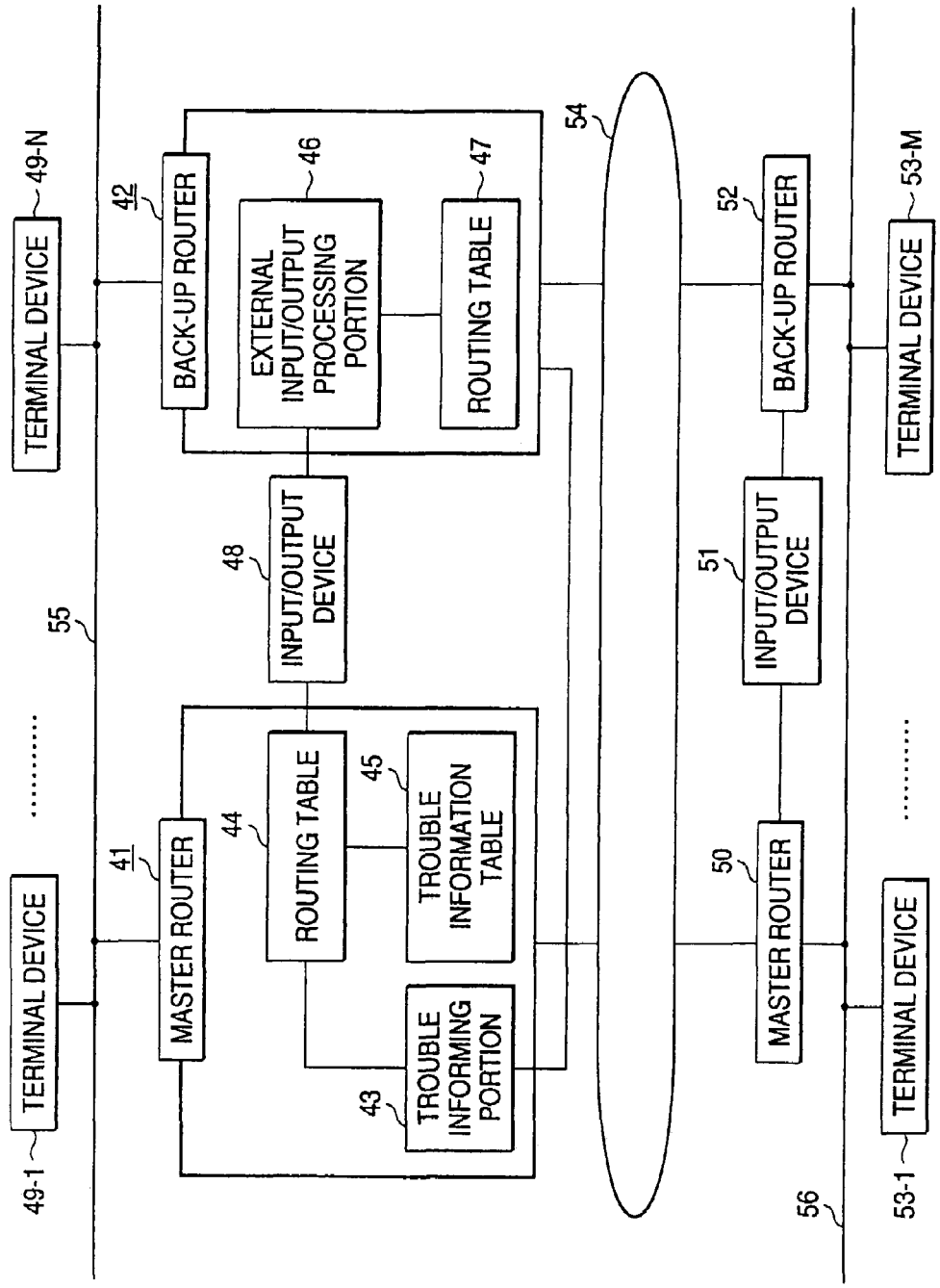
FIG. 12 is a block diagram showing an overall configuration of a network system in the prior art.

The control information converting function of the control information converting router 72 will be explained with reference to FIG. 11 hereunder. FIG. 11 shows an address translation table 101 which consists of a sender translated object address 102 and a translated address 103 in sequence from the left side. At this time, it is assume as an example that the sender translated object address 102 is an address of the decision-making judging computer 2 and the translated address 103 is an address of the control information converting router 72.

The control information converting router 72 translates the control information based on the address translation table 101 by using a NAT (Network Address Translation) function as an address translating function. More particularly, the sender address of the RIP RP13 transmitted from the controlling means 3 is compared with the sender translated object address 102. If they coincide with each other, the sender address is translated into the translated address 103 and then transmitted to the route propagating router 7 as the RIP RP14. When the sender translated object address 102 is the address of the decision-making judging computer 2 at this time, the sender address is translated in the address of the control information converting router 72 indicated by the translated address 103. As a result, the RIP RP 13 being transmitted from the controlling means 3 to the route propagating router 7 is replaced from the address of the decision-making judging computer 2 to the address of the control information converting router 72, and then transmitted to the route propagating router 7 as the RIP RP14. According to this translation, the route propagating router 7 receives the RIP RP14 as the control information transmitted from the control information converting router 72.

Then, the routing table generating function of the control information converting router 72 will be explained hereunder. The control information converting router 72 learns the route information from the route update side router 9 based on the protocol RP15. As described above, since it is defined that the control information converting router 72 does not receive the route information from the RIP RP13 and the RIP RP14, such control information converting router 72 learns in the routing table that the route to the network group 13 is the route update side router 9 as the sole route.

Then, the packet relaying function of the control information converting router 72 will be explained hereunder. The control information converting router 72 relays the packet transmitted from the route propagating router 7 based on the routing table. The packet for the destination network 25 is transmitted to the route update side router 9 based on the above-mentioned learning in the routing table. Accordingly, when the route is switched from the first route 12 to the second route 11, the packet transmitted from the sender router 8 is transmitted to the control information converting router 72 via the route propagating router 7 and then transferred to the route update side router 9 as the second route.

Then, an operation of the route propagating router 7 will be explained hereunder. The route propagating router 7 has independently a route propagating function for executing the route propagation to the sender router 8 by the protocol RP11 and a packet relaying function for relaying the packet from the sender router 8, based on the route propagation content received by the protocol RP12, the RIP RP14 and the route information in the routing table contained in the inside.

Then, the route propagating function of the route propagating router 7 will be explained hereunder. The route propagating router 7 receives the protocol RP11, the protocol RP12, and the RIP RP14 and learns them as the route in the routing table. Also, as mentioned above, since the route propagating router 7 learns that the learning priority is set higher in the order of RP14, RP12, and RP11, it reflects the learned contents on the routing table.

As shown in (f) of FIG. 10, in the stationary state in which the route change is not generated, the decision-making judging computer 2 does not transmit the control information of the network in unit of network according to this setting. Therefore, the route propagating router 7 does not receive the RIP RP14, and thus executes the route propagation of the route information for the first route 12, that is learned from the stationary route side router 10 based on the protocol RP12, to the sender router 8 as the route having the highest priority.

Also, as shown in (g) of FIG. 10, in the update state in which the route change is generated by the decision making, the decision-making judging computer 2 transmits the control information of the network. Therefore, the route propagating router 7 receives the RIP RP14 and thus propagates the route information for the control information converting router 72, that is learned based on the RIP RP14, to the sender router 8 as the route having the highest priority.

Then, the packet relaying function of the route propagating router 7 will be explained hereunder. The route propagating router 7 relays the packet from the sender router 8 to the destination network 25. In the stationary state in which the route change is not generated, the route propagating router 7 learns the route information of the protocol RP12 from the stationary route side router 10. Therefore, the route propagating router 7 transmits the packet to the stationary route side router 10 connected to the first route 12 to reach the destination network 25. Also, if the route change is generated based on the decision making, the route propagating router 7 transmits the packet to the control information converting router 72 since it has learned the route information of the RIP RP14 from the control information converting router 72. As a result, the packet can come up to the destination network 25 via the route update side router 9 connected to the second route 11.

Since the present invention is constructed as mentioned above, following advantages can be achieved.

The present invention can collect the route information and the decision materials for the decision making according to the state monitoring of the network, and also can switch the route in compliance with collected information and predetermined decision conditions.

Also, since the routers can collect the route information based on the routing protocol and can collect the decision elements for the route switching based on the SNMP, the general protocols maybe employed in collection and thus the particular devices and functions are not requested.

In addition, since the route generating router has the loop-back interface or the logical line, the route generating router has the route controlling function, nevertheless the line cost for the route controlling function is not needed.

Further, since the monitoring means monitors the network system or the computer selected previously as the monitored object, it can monitor the state of the network group which the packet can reach logically without the neighboring relationship.

Moreover, the present invention contains a predetermined threshold value in the predetermined decision conditions. When the traffic exceeds this threshold value, the switching for the first route can be interrupted and the second route can be set to the information propagation route as the breaking function.

Besides, since the control information converting router can convert the sender address of the route switching information transferred from the controlling means to the route propagating router by using the address translating function, it can relay the route information to the route propagating router without the change of the route information contained in the inside.

What is claimed is:

1. A decision-making route control system comprising:
    a decision-making judging computer including
        monitoring means for monitoring a state of a network to collect route information and decision elements for decision making;
        judging means for judging a route switching based on the route information, the decision elements, and predetermined decision conditions; and
        controlling means for outputting a route judged by the judging means as control information;
    a route generating router for replacing the control information with route switching information to output the route switching information; and
    a route propagating router having a routing table, and executing route propagation to a sender router based on routing information in the routing table and route switching information transferred from the route generating router,
    wherein the route generating router has a loop-back interface or a logical line, replaces a route valid/invalid situation as control information transferred from the controlling means based on a network management protocol with route switching information based on a routing protocol, and then outputs the route switching information to the route propagating router.

2. A decision-making route control system comprising:
    a decision-making judging computer including
        monitoring means for monitoring a state of a network to collect route information and decision elements for decision making;
        judging means for judging a route switching based on the route information, the decision elements, and predetermined decision conditions; and
        controlling means for outputting a route judged by the judging means as a route valid/invalid situation control information;
    a route generating router for replacing the control information with route switching information to output the route switching information; and
    a route propagating router having a routing table, and executing route propagation to a sender router based on routing information in the routing table and route switching information transferred from the route generating router,
    wherein the monitoring means collects route information of a first route and a second route and decision elements for decision making by monitoring a state of a network.

3. A decision-making route control system according to claim 2, wherein the judging means has a predetermined threshold value in predetermined decision conditions, and interrupts switching for the first route and set the second route as a information propagation route when a traffic exceeds this threshold value.

4. A decision-making route control system comprising:
    a decision-making judging computer including:
        monitoring means for monitoring a state of a network to collect route information and decision elements for decision making;
        judging means for judging a route switching based on the route information, the decision elements, and predetermined decision conditions; and
        controlling means for outputting a route judged by the judging means as control information;
    a route update logical network connecting router for switching a route from a first route side to a second route side in updating the route; and
    a logical network connecting router having route information and a routing table, and executing route propagation to a sender router by reflecting route information on the routing table based on control information transferred from the controlling means, and having a relaying function for relaying information to a first route or a second route in compliance with a route valid/invalid situation transferred from the controlling means based on a network management protocol,
    wherein the logical network connecting router has a logical line to propagate a route to the sender router, and has a relaying function to the first route or the second route.

5. A decision-making route control system comprising:
    a decision-making judging computer including:
        monitoring means for monitoring a state of a network to collect route information and decision elements for decision making;
        judging means for judging a route switching based on the route information, the decision elements, and predetermined decision conditions; and
        controlling means for outputting a route judged by the judging means as control information;
    a route update logical network connecting router for switching a route from a first route side to a second route side in updating the route; and
    a logical network connecting router having route information and a routing table, and executing route propagation to a sender router by reflecting route information on the routing table based on control information transferred from the controlling means, and having a relaying function for relaying information to a first route or a second route in compliance with a route valid/invalid situation transferred from the controlling means based on a network management protocol,
    wherein the monitoring means grasps a situation of non-neighboring router by monitoring a route update side router, and collects route information of the first route and the second route and decision elements for decision making.

6. A decision-making route control system comprising:
    a decision-making judging computer including:
        monitoring means for monitoring a state of a network to collect route information and decision elements for decision making;
        judging means for judging a route switching based on the route information, the decision elements, and predetermined decision conditions; and
        a controlling means for outputting a route judged by the judging means as control information;
    a control information converting router for replacing the control information transferred from the controlling means to output it; and a route propagating router having a routing table, and executing route propagation to a sender router based on the control information transferred from the control information converting router and routing information in the routing table, wherein the control information converting router has an address translation table, and address-translates route switching information transferred from the controlling means to the route propagating router to relay it to the route propagating router.

7. A decision-making route controlling method comprising the steps of:

monitoring a state of a network to collect route information and decision elements for decision making;

judging a route switching based on collected information and predetermined decision conditions;

outputting a route valid/invalid situation of a judged route to a route generating router based on a network management protocol;

replacing the route valid/invalid situation transferred based on the network management protocol with route switching information based on a routing protocol;

outputting replaced route switching information to a route propagating router; and executing route propagation to a sender router based on the route switching information and routing information in a routing table.

8. A decision-making route controlling method comprising the steps of:

monitoring a state of a network to collect route information and decision elements for decision making;

judging a route switching based on collected information and predetermined decision conditions;

outputting a route valid/invalid situation of a judged route to a logical network connecting router based on a network management protocol;

replacing the route valid/invalid situation transferred by the network management protocol with route switching information based on a routing protocol;

executing route propagation to a sender router based on replaced route switching information and routing information in a routing table; and selecting a relay to a first route or a second route according to the route valid/invalid situation.

9. A decision-making route controlling method comprising the steps of:

monitoring a state of a network to collect route information and decision elements for decision making;

judging a route switching based on collected information and predetermined decision conditions;

outputting a route valid/invalid situation of a judged route to a route propagating router based on a routing protocol;

replacing a sender address of control information transferred by the routing protocol and relaying it to the route propagating router; and executing route propagation to a sender router based on control information and routing information in a routing table.

\* \* \* \* \*